United States Patent
Zimmermann et al.

(10) Patent No.: US 9,667,886 B2
(45) Date of Patent: May 30, 2017

(54) APPARATUS AND METHOD FOR EDITING VIDEO DATA ACCORDING TO COMMON VIDEO CONTENT ATTRIBUTES

(71) Applicant: Sony Corporation, Minato-ku (JP)

(72) Inventors: Klaus Zimmermann, Neckartenzlingen (DE); Matthias Nagel, Stuttgart (DE); Piergiorgio Sartor, Fellbach (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/590,326

(22) Filed: Jan. 6, 2015

(65) Prior Publication Data
US 2015/0281595 A1 Oct. 1, 2015

(30) Foreign Application Priority Data
Mar. 27, 2014 (EP) .................................. 14161926

(51) Int. Cl.
- H04N 5/14 (2006.01)
- H04N 5/265 (2006.01)
- G06K 9/00 (2006.01)

(52) U.S. Cl.
CPC ......... *H04N 5/265* (2013.01); *G06K 9/00765* (2013.01)

(58) Field of Classification Search
CPC ...... H04N 5/147; H04N 19/142; H04N 19/87; H04N 19/179; H04N 21/854; G11B 27/034; G11B 27/28; G11B 27/34
USPC ......................................................... 348/571
See application file for complete search history.

(56) References Cited

U.S. PATENT DOCUMENTS

| | | | | |
|---|---|---|---|---|
| 7,020,381 B1* | 3/2006 | Kato | ................... | G11B 27/034 345/629 |
| 7,127,120 B2* | 10/2006 | Hua | ..................... | G11B 27/28 348/616 |
| 8,264,616 B2* | 9/2012 | Sugano | ............. | G06K 9/00711 348/171 |
| 8,346,470 B2 | 1/2013 | Geurts et al. | | |
| 2001/0049826 A1* | 12/2001 | Wilf | ..................... | H04N 21/84 725/120 |
| 2002/0100052 A1* | 7/2002 | Daniels | ............... | G11B 27/024 725/87 |
| 2002/0113813 A1* | 8/2002 | Yoshimine | .......... | G11B 27/034 715/723 |
| 2004/0146275 A1* | 7/2004 | Takata | ................ | G11B 27/034 386/286 |

(Continued)

OTHER PUBLICATIONS

Pedro F. Felzenszwalb, et al., "Cascade Object Detection with Deformable Part Models", 2010, 8 pgs.

(Continued)

*Primary Examiner* — Michael Lee
(74) *Attorney, Agent, or Firm* — Oblon, McClelland, Maier & Neustadt, L.L.P.

(57) ABSTRACT

An apparatus has a video input (3) for receiving input video data (2) and a processor (5). The processor (5) can perform detecting at least one video segment in the input video data on the basis of at least one predefined video characteristic attribute, detecting at least one video content attribute associated with the detected at least one video segment, and inserting video scene data into the input video data on the basis of the at least one detected video segment and the at least one video content attribute.

20 Claims, 2 Drawing Sheets

(56) References Cited

U.S. PATENT DOCUMENTS

| | | | | |
|---|---|---|---|---|
| 2005/0169371 | A1* | 8/2005 | Lee | H04N 19/105 375/240.03 |
| 2006/0007328 | A1* | 1/2006 | Paulsen | G11B 27/034 348/239 |
| 2008/0316307 | A1* | 12/2008 | Petersohn | G06K 9/00765 348/135 |
| 2009/0094637 | A1* | 4/2009 | Lemmons | H04N 7/17318 725/32 |
| 2011/0188836 | A1 | 8/2011 | Popkiewicz et al. | |

OTHER PUBLICATIONS

Pedro F. Felzenszwalb, et al., "Object Detection with Discriminatively Trained Part Based Models", 2009, 20 pgs.
Lucas Paletta, et al., "Context Based Object Detection from Video", 2003, 11 pgs.
Arun Hampapur, et al., "Comparison of Sequence Matching Techniques for Video Copy Detection", 2002, 8 pgs.
Ross B. Girshick, et al., "Object Detection with Grammar Models", 2011, 9 pgs.
Rainer Lienhart, "Comparison of Automatic Shot Boundary Detection Algorithms", 1999, 12 pgs.

* cited by examiner

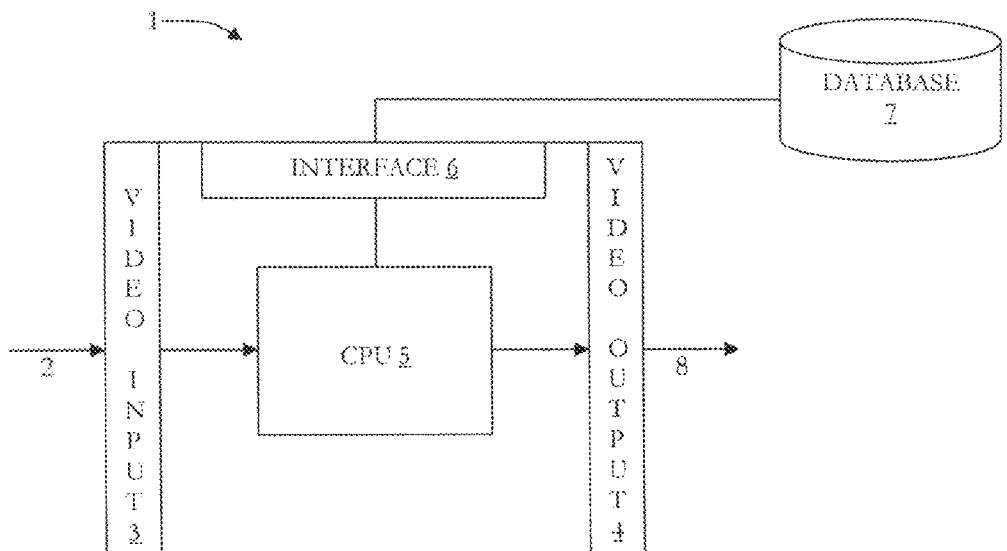
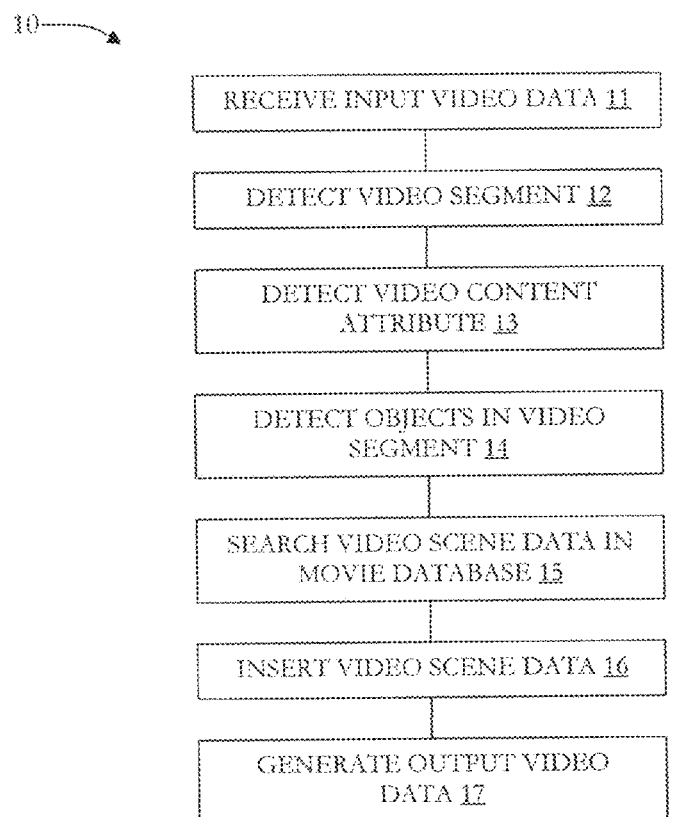
Fig. 1
Fig. 2

APPARATUS AND METHOD FOR EDITING VIDEO DATA ACCORDING TO COMMON VIDEO CONTENT ATTRIBUTES

TECHNICAL FIELD

The present disclosure generally pertains to apparatus and methods for video generation.

TECHNICAL BACKGROUND

It is known to generate a video with a camcorder or the like and also to publish such videos on internet platforms and the like. In particular, videos which are produced by laypersons oftentimes suffer from tedious video scenes. Additionally, videos oftentimes include at least partially video scenes which are not suitable for specific users, e.g. children or teenagers. Hence, for making videos more interesting or more suitable for specific users, typically a revision and editing of videos is necessary. However, revision and editing of videos is a laborious task and typically needs respective manpower.

Thus, it is generally desirable to improve methods and apparatus for generating video data.

SUMMARY

According to a first aspect the disclosure provides an apparatus, comprising a video input for receiving input video data and a processor. The processor is configured to detect at least one video segment in the input video data on the basis of at least one predefined video characteristic attribute, to detect at least one video content attribute associated with the detected at least one video segment, and to insert video scene data into the input video data on the basis of the at least one detected video segment and the at least one video content attribute.

According to a second aspect the disclosure provides a method, comprising receiving input video data, detecting at least one video segment in the input video data on the basis of at least one predefined video characteristic attribute, detecting at least one video content attribute associated with the detected at least one video segment, and inserting video scene data into the input video data on the basis of the at least one detected video segment and the at least one video content attribute.

Further aspects are set forth in the dependent claims, the following description and the drawings.

BRIEF DESCRIPTION OF THE DRAWINGS

Embodiments are explained by way of example with respect to the accompanying drawings, in which:

FIG. 1 schematically illustrates an embodiment of a video generation apparatus;

FIG. 2 is a flow diagram of an embodiment of a method, which can be performed by the video generation apparatus of FIG. 1;

DETAILED DESCRIPTION OF EMBODIMENTS

Figure 3:
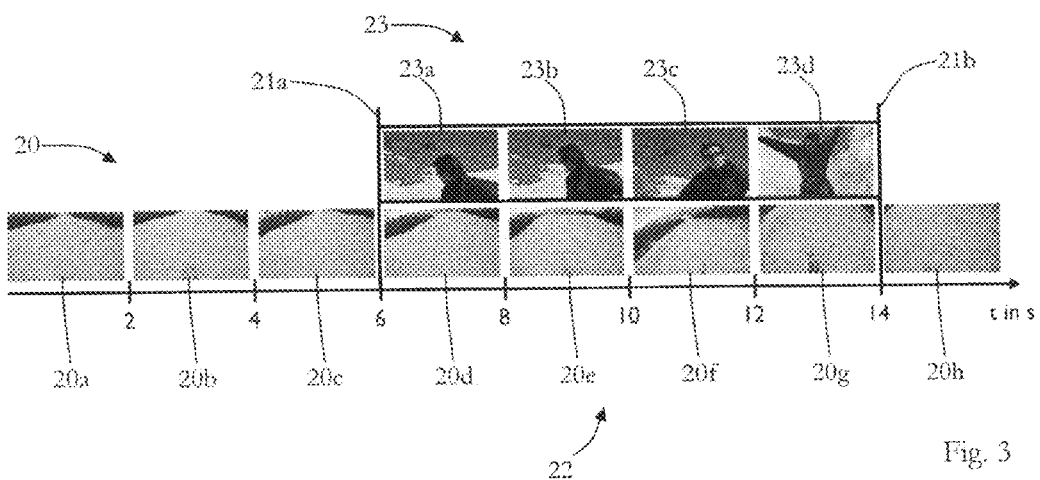
FIG. 3 exemplary shows a replacement of a tedious video segment with a video scene.

Before a detailed description of the embodiments under reference of FIG. 1 is given, general explanations are made.

As also discussed in the outset, many personal video sequences either suffer from longwearing, boring parts or resemble a collection of concatenated shots with a very sharp transition between them. Additionally, videos oftentimes include scenes which are not enjoyable for specific users. For example, brutal scenes may not be suitable for children or specific users do not want to see disgusting scenes, etc.

Traditionally, users may be given the chance to skip parts of a video, such as boring, brutal, disgusting parts or the like, and to move fast forward to more appealing scenes. However, in this case the user has to recognize these parts and manually advance to a different part in the sequence. This means that the user, typically, has to watch at least some seconds of an unpleasing scene before the user can recognize that he does not want to see the respective scene.

Hence, in such cases it could be useful to cancel, amend or replace such unpleasant scenes in order to provide a video which is more pleasant for a respective user.

Moreover, individuals, in particular laypersons, typically record video sequences in a contextless fashion. Such video sequences are oftentimes recorded with larger time intervals in between different video sequences and, for example, at different locations. Hence, in such cases a logical connection between such different sequences might not be present and such hard transitions between different video sequences or video scenes might be unpleasant for a user watching such a video.

In such cases it could be useful to find such contiguous, contextless sequences and to insert video scenes that combine both video sequences pertaining to different contexts, locations or the like. Thereby, a more memorable, smooth course of the video could be provided.

The solution provided in this disclosure may be able to analyze the video sequence(s) at hand, to find coherently matching video scenes, e.g. in movie databases, and to insert the video scenes either to replace respective parts and/or to make a smooth transition between concatenated shots in the original video sequence. In this way an appealing, enriched video sequence may be generated thereby increasing the entertainment factor of a user's personal video content.

Accordingly an embodiment of a method and an apparatus, respectively, comprises receiving input video data via a video input. A processor, such as a microprocessor, CPU, or the like, can be configured to perform method features as described in the following. The processor can be configured to detect at least one video segment in the input video data on the basis of at least one predefined video characteristic attribute, to detect at least one video content attribute associated with the detected at least one video segment, and to insert video scene data into the input video data on the basis of the at least one detected video segment and the at least one video content attribute.

The apparatus can be any type of electronic device, such as a personal computer, a mobile phone (smartphone), tablet pc, a server and/or client in a network, etc. The video input can also be any type of interface which is suitable to receive input data, such as universal serial bus interface, a firewire interface, a HDMI interface, or the like.

The input video data can be any type of data representing video material and it can be, for example, encoded with a video codec, such as MPEG-1, MPEG4, DivX, Windows Media Video, Real Video, etc., without that the present disclosure is limited to a specific video format.

The input video data can represent different scenes or shots as it is typical for videos. As also mentioned above, the input video data can include scenes which should be replaced and/or for which a smoother transition should be provided.

At least one video segment is detected in the input video data on the basis of at least one predefined video characteristic attribute. The at least one predefined video characteristic attributed can be indicative of at least one of: shot boundary between at least two video segments, emotion caused by the at least one video segment (e.g. disgust, fear, anger, contempt, sadness, surprise, happiness), and content intended for a predefined user group, such as for users being older than a certain age (such as 6 years, 12 years, 16 years, 18 years, 21 years or the like), without that the present disclosure is limited to these specific examples. The at least one predefined video characteristic attribute can be defined, for example, also by a user, producer, or any other person who watches the video.

The at least one video characteristic attribute can also be detected by analyzing, for example, eye movement, facial expressions or the like of a viewer of the input video data, as it is generally known for video summary/skimming techniques, video attention models, and video abstraction, etc.

For example, according to the known facial feedback hypothesis there is only a facial expression, if there is an emotion behind. A facial behavior of a viewer of the input video data can, thus, be analyzed, as it is generally known in the art, and facial expressions can be classifying with one of the seven universal expressions (disgust, fear, anger, contempt, sadness, surprise, happiness). In addition, it may be recognized, whether the viewer is currently watching the video attentively or whether he is distracted. This can be detected if his eyes are on the screen or not, as it is generally known in the art.

The thereby derived video characteristic attributes can be associated with the respective scenes of the input video data and the input video data can be segmented on the basis of the video characteristic attributes, as it is also generally known in the art.

Moreover, video characteristic attributes can also be derived by viewers of the input video data, for example, marking scenes as not suitable for children below 6 years, or as only suitable for adults, etc.

Additionally, it is generally known to analyze images, in order to find distinctive points, lines, textures and the like. Also person identification algorithms are known. Thereby, video characteristic attributes can be found, for example, by detecting weapons, blood, or other objects in the input video data, which is not suitable for children, etc.

The input video data can also be uploaded to a movie database or the like, as it is known in the art, where users can mark the input video data and specific scenes of the input video data with emotions, such as tedious, funny, etc.

For detecting adjacent video segments in the input video data between which video scene data in the function of a transition should be inserted, shot boundaries can be detected in the input video data as it is generally known in the art. In such embodiments the at least one video characteristic includes "shot boundaries". A shot boundary in the input video data will typically arise when a new "shot" is filmed, in the sense that a completely new scene is filmed with another background, other people, other kind of action, other illumination situation, other time (for example one shot is filmed on noon with sunlight and the next shot is filmed in the evening after sunset), etc. Hence, by detecting a shot boundary it is possible to find two adjacent video segments which are separated by a "hard cut" and, thus, where video scene data should be inserted in order to provide a smooth transition.

For shot boundaries it can be distinguished between hard cuts, fades and dissolve in some embodiments. For each type different existing algorithms can be used, as it is known to the skilled person. For example, for the detection of hard cuts color histogram differences can be analyzed in the input video data. For detection of hard cuts, fades and dissolve shot boundaries, an edge change ratio can be determined. Fades can also be detected by determining a standard deviation of pixel intensities. A dissolve can be detected by contrast analysis.

Hence, in some embodiments, the input video data can be segmented into one or more video segments on the basis of the at least one video characteristic attribute.

At least one video content attribute associated with the detected at least one video segment is detected. In some embodiments, also video segments before and/or after the detected at least one segment under analysis are analyzed, which can improve the detection of video content attributes. The at least one video content attribute can include, for example, at least one of: content information, position information, weather information, temperature information, barometric pressure information, and time information, without limiting the present disclosure to these specific examples. Content information can describe, for example, a kind of action (dancing, running, skiing, etc.), who is involved (persons, animals, landscape), theme of the video (wedding, birthday party, etc.). Such video content attributes can be defined, for example, by a user or producer of the input video data and/or a camcorder can, for example, tag the video input data with time and/or position information (GPS data or the like). The video content attributes can include respective keywords. The video content attributes can be included as metadata in the input video data and/or they can be attached to the input video data or in any other form associated with the input video data. The at least one video content attribute, thus, can be descriptive for the content of the input video data.

In some embodiments, motion of objects is detected in the detected at least one video segment, thereby static and moving objects can be detected in the input video data. The detection of objects and their movement is also known to the skilled person. By detection of static and moving objects, it is possible to automatically generate the at least one video content attribute for the detected at least one video segment.

For example, the known Google Image Search enables a service, which finds similar images to an uploaded image. The search analyzes the image to find its most distinctive points, lines and textures to create a mathematical model and match that model against billions of images to derive the best guess, i.e. the best matching image. In the area of computer animation, human movements are recorded using motion capturing. Therefrom characters are produced, which behave like real humans, and such artificial characters can also be used for finding objects in the at least one video segment. Other approaches for object detection system are based on mixtures of multiscale deformable part models, which are able to describe objects.

The at least one video content attribute can include metadata, keywords and the like which are found by comparing images from the detected at least one video segment with images from a database, which have respective metadata, keywords or the like associated with it.

Video scene data are inserted into the input video data on the basis of the at least one detected video segment and the at least one video content attribute. The video scene data can be inserted into the at least one detected video segment and/or the video scene data can replace the at least one detected video segment. Moreover, the video scene data can be inserted between at least two adjacent detected video segments.

The video scene data can be adapted to the detected at least one video segment, e.g. by adapting the length, the color, the video format, etc.

The video scene data can be chosen by a user of the input video data, e.g. from a video/movie database or other available video material, but in some embodiments, the video scene data are automatically searched on the basis of the at least one video content attribute.

Thereby, a fully automatic video generation can be implemented, whereby, personal videos can be automatically enriched and enhanced by e.g. professional movie content, tedious video sequences can be designed and amended in an exciting and entertaining way, and contextually smooth video sequences can be automatically generated.

The video scene data can be searched in a video database or movie database on the basis of the at least one video content attribute. Thereby video material can be found, which can be used for replacing video segments and/or for being inserted between two adjacent video segments for providing a smoother transition between to video segments. The video scene data is found by matching the at least one video content attribute with a respective keyword or the like which is stored together with the video scene data in the video database. Also other parameters can be used for finding respective video scene data, e.g. a length information of the video segment to be replaced, video format information, color information, geo information, etc. It is known that there are movie databases available which are accurately tagged with metadata (e.g. content of the scenes, locations, actors) in which keyword searches can be performed, whereby respective video scene data can be found. It is also known to the skilled person to perform sequence matching, e.g. for video copy detection (e.g. detection of pirated material, video fingerprinting). Such a matching technique can also be used for finding video scene data matching to the at least one video segment.

Hence, in some embodiments two features are implemented. On the one hand tedious, sad, brutal, etc., scenes in a video are inserted/replaced with/by video scenes that fit well into the specific context. On the other hand transitions are created between context-free shots to connect both shots coherently.

The method(s) described herein can also be implemented as a computer program comprising program code causing a computer to perform the method(s) as described herein.

Some embodiments pertain to a non-transitory computer-readable recording medium that stores therein a computer program product, which, when executed by a processor, causes the method(s) described herein to be performed.

Figure 4:
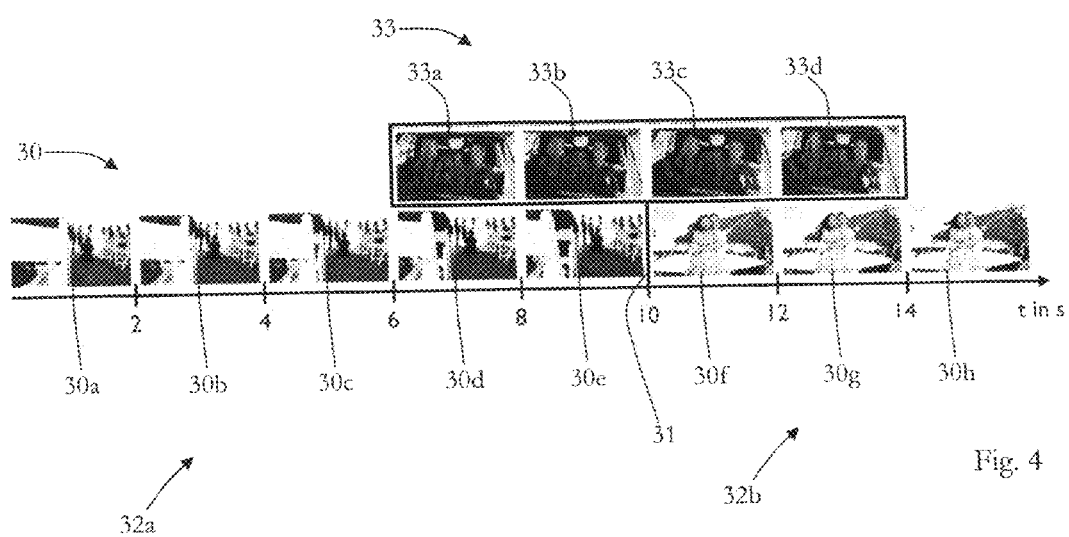
FIG. 4 exemplary shows an insertion of a video scene between two video segments.

Returning to FIG. 1, there is schematically illustrated an apparatus for video generation 1, which is configured to perform the methods described herein and as also explained under reference of FIG. 2 and also of FIGS. 3 and 4.

The video generation apparatus 1 receives input video data 2 (11, FIG. 2) via a video input 3 and/or via an interface 6 which can be connected to a data storage, to a (wireless) network, to the internet, etc. The present disclosure is not limited to a specific source from which input video data 2 can be received and it is not limited to a specific video input through which input video data can be received. The interface 6 is also connected to a movie database 7. The connection between the interface 6 and the movie database 7 can be established via the internet, but the movie database 7 could also be located on a local storage or on a remote server, etc. The movie database 7 includes movies and metadata associated with the movies, such that the database 7 can be searched for specific characteristics on the basis of video content attributes as discussed above.

The video generation apparatus 1 also has a processor 5 which is configured to perform the method(s) described herein, in particular the method described below under reference of FIGS. 2 to 4. The video generation apparatus 1 also has a video output 4 to output video data 8, as will be discussed in the following.

Please note that the division of the video generation apparatus 1 into sections 3 to 6 is only made for illustration purposes and that the present invention is not limited to any specific division of functions in specific units, and sections 3 to 6 can be implemented in hardware and/or software.

In the following, exemplary, a replacement of a tedious video segment is explained.

To ensure a high entertainment value of the generated output video data 8, the following criteria for selected video content can be used for replacing tedious video segments from a video.

Video sequences or video segments might be exactly labeled in some embodiments by fixed and static objects that occur in those sequences with attributes and states. For example: A red car travels from the left to the right through a video represented by input video data at a point of time with taking certain duration. Such a video segment (red travelling car) can be analyzed on the basis of detection of static/moving objects in the video. Thereby, video content attributes can be obtained in the form of metadata which describe the content of the video (e.g. red car, travelling).

Movie sequences, i.e. video scene data, could be extracted from (popular) movies featuring famous actors. The protagonist in the personal video ideally resembles similarities to the actor in a particular movie. As discussed, such movie sequences can be found by searching one or more movie databases, such as database 7 (FIG. 1).

The length of the video sequence represented by video scene data needs to fit to the deleted video sequence in some embodiments and should not be too short. In some embodiments, the video sequence which is to be inserted can ideally have matching geo-positions, but it should at least match contextually.

A replacement of tedious sequences of the video represented by input video data 2 is explained in the following under reference of FIGS. 2 and 3. Generally, the input video sequence can be a one-shot personal video or a complete sequence consisting of several shots, or any other type of video.

At 12, tedious parts are detected in an exemplary video sequence 20 (FIG. 3). The video sequence 20 is a one-shot POV personal snow sports video represented by individual frames 20a to 20h (i.e. eight frames) in two seconds intervals. In the present embodiment, the video characteristic attribute is "tedious" and with one of the methods describe above, a tedious video segment 22 is found at a time position t=6 of 8 seconds length, i.e. between frames 20d to 20g marked with the boundary line 21a before frame 20d and the boundary line 21b after the frame 20g of the detected tedious video segment 22.

The tedious video segment 22 is analyzed in order to detect at least one video content attribute at 13 by detecting static/moving objects at 14 in the video segment 22 with one or more of the methods discussed above (e.g. a hill is detected as static object). Also the video segments before and after the tedious video segment 22 can be investigated in order to find at least one video content attribute (where, e.g. also skier can be detected as moving objects). Detected video content attributes for this sequence are for example: person skiing down the hill, blue sky, jumping.

With these detected video content attributes, a matching video sequence 23 of the movie "The World is not enough" was found in the database 7 of movie sequences by performing, at 15, a respected search for video scene data in the movie database 7 on the basis of the detected video content attributes. The matching video sequence 23 is eight seconds long and it is represented by four frames 23a to 23d. In this example the matching video sequence 23 has the same length as the tedious video segment 22, but, as discussed above, the matching video sequence can also have a length which is different and it may be adapted to the length of the detected video segment.

At 16, the detected tedious video segment is replaced by the inserted matching sequence 23 found during the search 15 and respective output video data 8 are generated at 17 which can be output by the video generator apparatus 1 at the video output 4.

As mentioned above, the video scene data can also be inserted into the detected video segment. For example, in the present embodiment, only the skiing person of the matching video sequence 23 could be inserted, while the background of the tedious video segment 22 could be kept.

An embodiment for finding shot boundaries and providing smooth transitions is now discussed under reference of FIG. 4, wherein the method of FIG. 2 is performed in an analog way.

Generally, the aim is to make transitions in a video sequence that consists of several shots contextually smooth. Individual shots are recognized by the method of detecting shot boundaries, discussed above and are segmented subsequently and accordingly, i.e. the at least one video characteristic attribute is "shot boundary". With the single static/moving objects detection performed for individual video segments, object attributes as video content attributes can be found, which label the video segments by the object attributes.

For instance, if there is a video segment "n" whose video content attributes are very different from the video content attributes of a later video segment "n+1", then there is no smooth transition and a hard cut is detected.

Thus, the video content attributes of the two video segments n and n+1 are combined to find possibly matching video sequences in a movie database. In the video sequence found as "matching video sequence" at least one video content attribute of the video segment n and one video content attribute of the later video segment n+1 should occur. To get a smooth transition between the two video segments n and n+1, the matching movie sequence is inserted between the two video segments n and n+1.

FIG. 4 shows an example of contextual transitions between two shots in an input video 30. The input video 30 is represented by eight frames 30a to 30h which are at 2 second intervals.

As discussed, in FIG. 2, at 11 the input video 30 is received and at 12 the first shot from t=0 (frame 30a) to t=10 (frame 30b), which is a marriage ceremony, and the second shot from t=10 (30f) to t=16 (30h), which is a honeymoon shot, are detected by a shot boundary detection method as describe above. The shot boundary between the first and second shot is represented by line 31 at t=10. Thereby a first video segment 32a representing the first shot (frames 30a to 30e) and a second video segment 32b (frames 30f to 30h) are detected into which the input video 30 is segmented.

The first video segment 32a and the second video segment 32b are analyzed at 13 and 14, in order to find static/moving objects and thereby detecting respective video content attributes for the first 32a and the second 32b video segment.

For instance, for the first video segment 32a the video content attributes "wedding, party" can be found, while for the second video segment 32b the video content attributes "mountain, couple, holiday" are found.

With these video content attributes a matching movie sequence 33 in the movie "The Heartbreake Kid" was found. The matching movie sequence 33 shows a couple driving from a party into holidays, and, thus contextually connects the first and second video segments 32a and 32b and, thus, the first and second shots. The matching movie sequence 33 is inserted at the boundary line 31 at t=10 at 16 and respective output video data 8 are generated at 17, which can be output at the video output 4.

Of course and also discussed above, the method discussed in connection with FIG. 3, i.e. the replacement of video segments, and the method discussed in connection with FIG. 4, i.e. the insertion of a video scene data, can be combined in some embodiments.

Note that the present technology can also be configured as described below.

(1) An apparatus, comprising:
a video input for receiving input video data; and
a processor configured to:
detect at least one video segment in the input video data on the basis of at least one predefined video characteristic attribute;
detect at least one video content attribute associated with the detected at least one video segment;
insert video scene data into the input video data on the basis of the at least one detected video segment and the at least one video content attribute.

(2) The apparatus of (1), wherein the video scene data is inserted into the at least one detected video segment.

(3) The apparatus of (1) or (2), wherein the video scene data replace the at least one detected video segment.

(4) The apparatus of anyone of (1) to (3), wherein the video scene data is inserted between at least two adjacent detected video segments.

(5) The apparatus of anyone of (1) to (4), wherein the processor is further configured to search for video scene data on the basis of the at least one video content attribute.

(6) The apparatus of (5), wherein the processor is further configured to search the video scene data in a video data base on the basis of the at least one video content attribute.

(7) The apparatus of anyone of (1) to (6), wherein the at least one video content attribute includes at least one of: content information, position information, weather information, temperature information, barometric pressure information, and time information.

(8) The apparatus of anyone of (1) to (7), wherein the at least one video characteristic attribute is indicative of at least one of: shot boundary between at least two video segments, emotion caused by the at least one video segment, and content intended for a predefined user group.

(9) The apparatus of anyone of (1) to (8), wherein the processor is further configured to detect shot boundaries in the input video data.

(10) The apparatus of anyone of (1) to (9), wherein the processor is further configured to detect motion of objects in the detected at least one video segment.

(11) A method, comprising:
receiving input video data;
detecting at least one video segment in the input video data on the basis of at least one predefined video characteristic attribute;
detecting at least one video content attribute associated with the detected at least one video segment; and
inserting video scene data into the input video data on the basis of the at least one detected video segment and the at least one video content attribute.

(12) The method of (11), wherein the video scene data is inserted into the at least one detected video segment.

(13) The method of (11) or (12), wherein the video scene data replace the at least one detected video segment.

(14) The method of anyone of (11) to (13), wherein the video scene data is inserted between at least two adjacent detected video segments.

(15) The method of anyone of (11) to (14), further comprising searching for video scene data on the basis of the at least one video content attribute.

(16) The method of (15), further comprising searching the video scene data in a video data base on the basis of the at least one video content attribute.

(17) The method of anyone of (11) to (16), wherein the at least one video content attribute includes at least one of: content information, position information, weather information, temperature information, barometric pressure information, and time information.

(18) The method of anyone of (11) to (17), wherein the at least one video characteristic attribute is indicative of at least one of: shot boundary between at least two video segments, emotion caused by the at least one video segment, and content intended for a predefined user group.

(19) The method of anyone of (11) to (18), wherein detecting at least one video segment comprises detecting shot boundaries in the input video data.

(20) The method of anyone of (11) to (19), further comprising detecting motion of objects in the detected at least one video segment.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The present application claims priority to European Patent Application 14 161 926.2, filed in the European Patent Office on Mar. 27, 2014, the entire contents of which being incorporated herein by reference.

The invention claimed is:

1. An apparatus, comprising:
circuitry configured to
receive input video data;
detect a first video segment in the input video data based on a video characteristic attribute;
determine a first video content attribute associated with the first video segment;
determine a second video content attribute associated with a second video segment that is consecutive to the first video segment;
combine the first video content attribute and the second video content attribute to generate a combined video content attribute;
search a video database, based on the combined video content attribute, for video scene data that corresponds to the combined video content attribute;
receive, from the video database, the video scene data that is a result of the search; and
add the video scene data into the input video data between the first video segment and the second video segment.

2. The apparatus of claim 1, wherein the video scene data is inserted into the input video data as a transition between the first video segment and the second video segment.

3. The apparatus of claim 1, wherein the video scene data replaces at least a part of the first video segment or a part of the second video segment in the input video data.

4. The apparatus of claim 1, wherein the circuitry is further configured to search the video database for the video scene data based on the video characteristic attribute.

5. The apparatus of claim 1, wherein the first video content attribute includes at least one of content information, position information, weather information, temperature information, barometric pressure information, and time information of the first video segment.

6. The apparatus of claim 1, wherein the video characteristic attribute indicates any one of a shot boundary between the first video segment and the second video segment, an emotion of a viewer caused by the first video segment, and a content intended for a predefined user group.

7. The apparatus of claim 1, wherein the circuitry is further configured to detect shot boundaries in the input video data.

8. The apparatus of claim 1, wherein the circuitry is further configured to detect motion of objects in the first video segment.

9. A method, comprising:
receiving input video data;
detecting, by circuitry, a first video segment in the input video data based on a video characteristic attribute;
determining, by the circuitry, a first video content attribute associated with the first video segment;
determining, by the circuitry, a second video content attribute associated with a second video segment that is consecutive to the first video segment;
combining, by the circuitry, the first video content attribute and the second video content attribute to generate a combined video content attribute;
searching, based on the combined video content attribute, a video database for video scene data that corresponds to the combined video content attribute;
receiving, from the video database, the video scene data that is a result of the search; and
adding the video scene data into the input video data between the first video segment and the second video segment.

10. The method of claim 9, wherein the video scene data is inserted into the input video data as a transition between the first video segment and the second video segment.

11. The method of claim 9, wherein the video scene data replaces at least a part of the first video segment or a part of the second video segment in the input video data.

12. The method of claim 9, further comprising searching the video database for the video scene data based on the video characteristic attribute.

13. The method of claim 9, wherein the first video content attribute includes at least one of content information, position information, weather information, temperature information, barometric pressure information, and time information of the first video segment.

14. The method of claim 9, wherein the video characteristic attribute indicates any one of shot boundary between the first video segment and the second video segment, an emotion of a viewer caused by the first video segment, and a content intended for a predefined user group.

15. The method of claim 9, wherein detecting the first video segment comprises detecting shot boundaries in the input video data.

16. The method of claim 9, further comprising detecting, by the circuitry, motion of objects in the first video segment.

17. A non-transitory computer readable medium storing computer executable instructions that, when executed by circuitry of a computer, causes the computer to:
   receive input video data;
   detect a first video segment in the input video data based on a video characteristic attribute;
   determine a first video content attribute associated with the first video segment;
   determine a second video content attribute associated with a second video segment that is consecutive to the first video segment;
   combine the first video content attribute and the second video content attribute to generate a combined video content attribute;
   search a video database, based on the combined video content attribute, for video scene data that corresponds to the combined video content attribute;
   receive, from the video database, the video scene data that is a result of the search; and
   add the video scene data into the input video data between the first video segment and the second video segment.

18. The apparatus according to claim 1, wherein the circuitry is further configured to
   detect a static object in the first video segment of the input data;
   determine the video characteristic attribute of the static object; and
   detect the first video content attribute according to the video characteristic attribute and the static object.

19. The apparatus according to claim 1, wherein the circuitry is further configured to add the video scene data into the input video data to overlap with a part of the first video segment and a part of the second video segment so as to provide a transition between the first video segment and the second video segment.

20. The apparatus according to claim 1, wherein the second video segment is after the first video segment in the input video data.

* * * * *